United States Patent
Scanlan

[15] 3,676,738
[45] July 11, 1972

[54] SAFETY DEVICE FOR PREVENTING ELECTRIC SHOCK

[72] Inventor: Warren F. Scanlan, Philadelphia, Pa.
[73] Assignee: United Kingdom Atomic Energy Authority, London, England
[22] Filed: March 24, 1970
[21] Appl. No.: 22,152

[52] U.S. Cl. .............................................317/18 R, 317/49
[51] Int. Cl. ......................................................H02h 3/16
[58] Field of Search .......................317/49, 18 D, 18 R, 27 R

[56] References Cited

UNITED STATES PATENTS

| | | | |
|---|---|---|---|
| 3,329,913 | 7/1967 | Camp | 335/38 |
| 3,259,802 | 7/1966 | Steen | 317/18 |
| 3,319,123 | 5/1967 | Scanlan | 317/18 D |

Primary Examiner—James D. Trammell
Attorney—Smith, Harding, Earley & Follmer

[57] ABSTRACT

A ground fault interrupter circuit utilizes the potential difference between the neutral supply line and ground to sense faults. An ordinary resettable magnetic circuit breaker is used, but delay circuitry prevents immediate reenergization of the breaker coil resulting from a surge when resetting is attempted.

8 Claims, 2 Drawing Figures

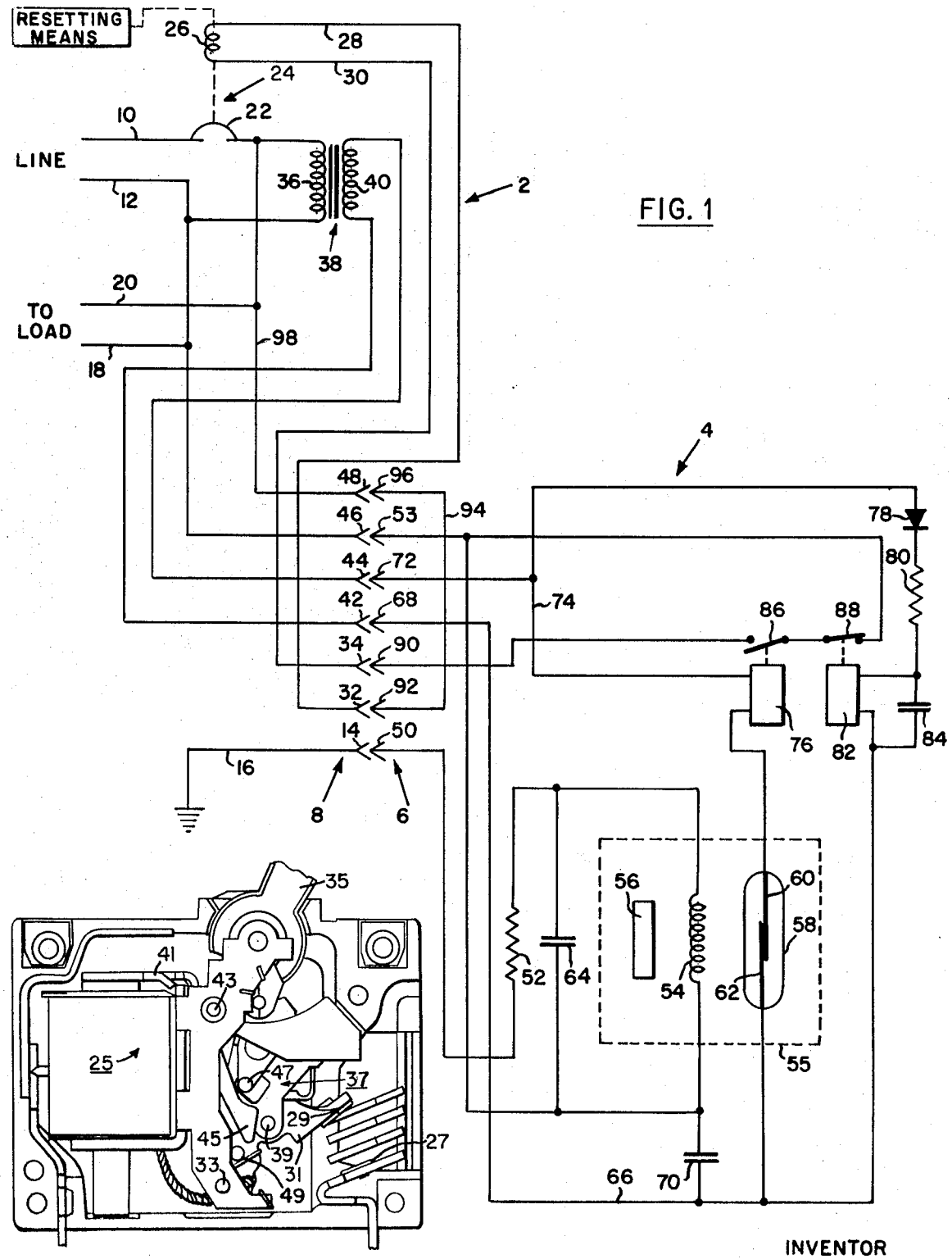

SAFETY DEVICE FOR PREVENTING ELECTRIC SHOCK

BACKGROUND OF THE INVENTION

This invention relates to safety devices, and particularly to a class of electrical safety devices known as "ground fault interrupters."

Various circuits have been used in the past for the prevention of physical injury resulting from electric shock, and the most successful devices, so far, have been those which effect interruption of current whenever a ground fault is sensed. A ground fault will occur when the body of a person comes into contact with an energized conductor, either because the body is in direct contact with ground, or because the capacitance between the body and ground is sufficient to conduct a detectable current. Different devices have been used for detecting such faults. For example, one scheme utilizes a differential transformer having a first winding connected in series with one side of the line, and a second winding in series with the other side of the line, in balanced relation with the first winding. A third winding becomes energized whenever a ground fault occurs because the ground fault prevents the current in the first winding from being equal to and balancing the current in the second winding.

Another scheme, as illustrated in my U.S. Pat. No. 3,319,123, issued May 9, 1967, utilizes an isolation transformer in conjunction with a balance circuit which becomes unbalanced whenever a ground fault occurs.

In these circuits, means are provided by which the line current is interrupted as rapidly as possible whenever a fault is detected. The more rapidly the current is interrupted, the less electrical energy is absorbed by the person causing the fault.

One difficulty with interrupters utilizing differential transformers results from the sensitivity of differential transformer cores to temperature changes. In devices utilizing differential transformers, temperature changes may render the sensitivity either too low or too high.

Interrupters utilizing transformers which isolate the load from the line are bulky and expensive.

Ground fault interrupters require a breaker to interrupt line current when a fault is detected. One problem arises because of a safety requirement that circuit breakers be constructed so that their purpose cannot be defeated by mechanically holding the reset button in a resetting condition. This might be done, for example, by taping the reset button down. Most circuit breakers are constructed so that energization of the magnetic coil which effects interruption will effect interruption even if the reset button is in the depressed condition. It is then necessary to release the reset button and depress it again under conditions such that the coil will not be energized. When these breakers are utilized in ground fault interrupter circuits, an attempt to reset the breaker to restore current to a load may produce a surge which may be sensed as a ground fault. This will effect operation of the breaker, so that it is impossible to restore current to the load.

Another problem exists with ground fault interrupter units which are designed for permanent installation. If any part of the unit breaks down, line current may be interrupted for a long period of time until a repair can be effected.

SUMMARY OF THE INVENTION

In accordance with this invention, no differential transformer is used, and no isolation transformer capable of handling the entire load current is necessary. Advantage is taken of the potential difference between the neutral side of a supply line and ground to effect a detectable change in current in a circuit branch when ground fault occurs.

The circuit in accordance with the invention makes use of a resettable, electro-mechanical breaker of the kind constructed so that it cannot be defeated by holding the reset button down. Delay circuitry is provided to prevent immediate reenergization of the energizing coil of the breaker when resetting is attempted. This prevents electrical surges, which may be interpreted by the sensing circuitry as ground faults, from effecting immediate reopening of the breaker whenever resetting is attempted. The circuitry, however, does not defeat the purpose of the special breaker construction, since even if the reset button is held down, the breaker will operate when a fault occurs.

One object of the invention, therefore, is to provide a safety device for preventing electrical shock which does not require a differential transformer, a bulky isolation transformer or any other specialized transformer or balancing circuit.

Another object of the invention is to provide a safety device for preventing electric shock which utilizes a resettable breaker, but which cannot be defeated by holding the resetting control.

Another object of the invention is to provide a safety device for preventing electric shock in which the sensing circuitry is in a modular unit which may be readily replaced in the event of a malfunction resulting in an undesired and unnecessary interruption of current, and in which current is not interrupted for a long period of time as a result of such a malfunction.

Another object is to provide a safety device for preventing electric shock which is reliable, fail-safe, highly sensitive and rapid in its operation. Other objects will be apparent from the following description, read in conjunction with the accompanying drawing.

BRIEF DESCRIPTION OF THE DRAWING

FIG. 1 is a schematic diagram of the safety device in accordance with the invention; and FIG. 2 is a side elevation showing the mechanical details of a resettable circuit breaker suitable for use in the circuit of FIG. 1.

DESCRIPTION OF THE PREFERRED EMBODIMENT

The circuitry, as shown in FIG. 1, is in the condition which it would be in during normal operation, with current being delivered to a load, and with no ground fault occuring.

In FIG. 1, permanently installed circuitry is indicated generally at 2, and reference numeral 4 indicates sensing and control circuitry, preferably provided in a plug-in module, adapted to be connected to the permanent circuitry by the engagement of a multiple plug 6 on the module with a socket 8.

An alternating current supply line, which would typically carry 120 volts comprises a "high" side 10, and a "neutral" side 12. In most terminal boxes through which electricity is supplied to the home, the neutral side 12 of the line is at a potential which is different from ground. That is, with a nominally 120 volt (rms) line, the voltage which will be measured between the neutral side and ground will be typically 15 volts, while the voltage measured between the high side and ground will be typically 105 volts.

In the permanent wiring, terminal 14 of socket 8 is connected through wire 16 to ground, preferably to a water pipe.

The neutral side 12 of the line may be connected directly to a load 18, e.g., an appliance or a group of appliances, through line 18.

The high side 10 of the line may be connected to a load through line 20, but line 20 is connected to line 10 through the contact element 22 of a breaker 24. Breaker 24 has a winding in the form of a solenoid 26, which is mechanically arranged to open contact member 22 to effect interruption of the circuit in the high side of the line when it receives a signal through lines 28 and 30.

Breaker 24 is of the resettable type, and is preferably of the kind in which interruption of current can take place even though the resetting control is held. A typical breaker of this type is disclosed in detail in U.S. Pat. No. 3,329,913, issued July 4, 1967 to W. W. Camp.

The typical breaker, as shown in FIG. 2, comprises a solenoid 25 and a pair of current-carrying contacts 27 and 29, the latter being a movable contact. Contact 29 is carried by movable arm 31, pivoted at 33. A resetting handle 35 is operatively connected to arm 31 through a collapsible toggle mechanism or latching system 37. The toggle mechanism is connected to arm 31 through pin 39. Armature 41 is pivoted at 43 and arranged to be operated by solenoid 25. At one extreme of the armature, there is provided a trip member 45 which is able to engage trip arm 47 when the solenoid is energized and the contacts are closed.

Thus, when the solenoid is energized, armature 41 is pivoted counterclockwise about pivot 43, causing the trip member 45 to pivot to the right and to trip arm 47 forming part of a latch assembly which, when the toggle mechanism 37 has been moved to the contacts closed position, is juxtaposed with the trip member 45 whereupon toggle mechanism 37 collapses under the pressure of a collapsing spring 49.

Handle 34 is shown in the contacts closed condition. However, because the connection between the handle and the contacts is through a collapsible toggle assembly, it is possible for the contacts to be opened and current to be interrupted upon energization of the solenoid, even though the resetting handle is held in the position indicated.

Returning to FIG. 1, lines 28 and 30, which receive the signal for effecting interruption by the breaker are connected respectively to terminals 32 and 34 of socket 8.

The primary winding 36 of a transformer 38 is connected between the neutral side 12 of the line and to the high side 10 through contact member 22. The purpose of this transformer is to supply operating current for the sensing circuitry, and its secondary voltage and current ratings will depend on the requirements of the sensing circuitry. Secondary winding 40 is connected between terminals 42 and 44 of socket 8. The neutral side 12 of the line is connected directly to terminal 46 of socket 8, and the high side 10 of the line is connected, through contact member 22, to terminal 48 of socket 8.

The permanently wired apparatus described so far may be wired into the terminal boxes in which electric current enters the home or building which is to be protected. However, in order to avoid interruption of the operation of a large number of appliances in a building or home when a fault occurs, several breakers 24 may be wired in different parts of the home or building to localize the current interruption which will result from the occurence of a fault. The breaker may even be wired into an individual appliance, for example, a washing machine.

The circuitry in the sensing module will now be described. Terminal 50 of plug 6, which is connectable to ground through terminal 14 of socket 8 is connected through a resistor 52, and an inductor 54 to terminal 53 of plug 6. Terminal 56 is connectable, through terminal 46 of socket 8, to the neutral side 12 of the line. Resistor 52 and inductor 54 constitute a circuit branch which conducts current resulting from the potential difference between the neutral side of the line and ground. The current in inductor 54 produces a magnetic field, the strength of which depends on the magnitude of the current in this branch.

Preferably, inductor 54 is part of a magnetically shielded unit 55 which consists of inductor 54, a permanent magnet 56 and a sealed magnetically operable reed switch 58. The three elements in unit 55 are arranged so that permanent magnet 56 maintains the contacts 60 and 62 of the reed switch in a closed condition except when the magnetic field of inductor 54 increases in strength beyond a predetermined limit. The reed switch is arranged in proximity to inductor 54 so that an increase in the magnetic field of the inductor will have this effect. The resistor 52 and inductor 54 should be selected, and the elements in unit 55 arranged so that a current of about 3 ma. in resistor 52 will result in opening of the contacts of the reed switch.

Capacitor 64 is connected in parallel with inductor 54 to cause the magnetic field of inductor 54 to vary through a greater range for a given change in the current in resistor 52. Line 66 is connected to terminal 68 of plug 6, which is connectable through terminal 42 of socket 8 to one side of the secondary winding 40 of the transformer 38. Capacitor 70 is connected between inductor 54 and line 66 for the purpose of preventing chattering of contacts 60 and 62 of the reed switch, which may cause television interference.

While one side of the secondary winding of the transformer is connectable to line 66, the other side is connectable through terminal 44 of socket 8 and terminal 72 of plug 6 to line 74. Line 74 is connected through the winding of AC relay 76, and through reed switch 58 to line 66. Line 74 is also connected through diode 78, resistor 80 and the winding of DC relay 82 to line 66. Capacitor 84 is connected across the winding of relay 82.

Relay 76 has a set of normally closed contacts 86, that is, contacts which are closed when the relay coil is in an unenergized condition. Relay 82 has a set of normally open contacts 88. Contacts 86 and 88 are connected in series between terminals 56 and 90 of plug 6. These contacts, therefore, provide a path for the energization of solenoid winding 26 of the breaker from neutral line 12, through terminals 46 and 53, through contacts 88 and 86, terminals 90 and 34 and line 30. The return path is through line 28, terminal 32 of socket 8, terminal 92 of plug 6, line 94, terminal 96 of plug 6, terminal 48 and line 98 to the high side of the line through the breaker contact member 22.

The operation of the safety device will now be described. A fault occurs when the body of a person comes into contact with line 20. The body is either in direct contact with ground, or has a capacitance to ground. Therefore, a current is conducted from line 20 (the high side), to ground, through the body or through the body and its capacitance to ground. The conduction of current through the body raises the potential of line 16 relative to the neutral side of the line. Consequently, the current through resistor 52 and inductor 54 increases, increasing the magnetic field of the inductor. When this occurs, the magnetic field of the inductor becomes sufficient to oppose the field of permanent magnet 56, and the contacts 60 and 62 of the reed switch come apart.

The opening of the reed switch contacts disconnects operating current to the winding of relay 76, and relay contacts 86 close. Since contacts 88 of relay 82 are also closed at this time, a path is provided for energization of winding 26 of the breaker 24. The breaker contacts open and remain open, deenergizing line 20. This operation takes place very rapidly because of the rapid operation of unit 55 in response to a ground fault occuring in line 20. Capacitor 64 aids this rapid response.

The operation is also fail-safe in that the winding of relay 76 must be energized continuously for normal delivery of current to the load.

As mentioned previously, when a breaker is reset to restore current to a load, a surge can occur which might be interpreted by the fault detector as a ground fault. Relay 82 and its associated circuitry prevent the delivery of an interruption signal to winding 26 as a result of such a surge. Before resetting of breaker 24 is attempted, and while contacts 22 are open, contacts 86 are closed and contacts 88 are open.

When resetting takes place, contacts 22 are closed, and contacts 86 may remain closed momentarily, but for a sufficiently long time that an interruption signal would be produced were it not for the fact that contacts 88 are open. Contacts 88 do not close until capacitor 84 has built up a sufficient DC charge to operate the winding of relay 82. Elements 82, 84, 80 and 78 constitute a time-delay relay, the delay being determined primarily by the values of resistor 80 and capacitor 84. Contacts 88 only close after contacts 86 are finally opened. Consequently, no interruption signal is delivered to the breaker winding 26.

Plug 6 and socket 8 allow disconnection of the sensing module 4, and immediate replacement by a spare module. During the period of time between removal of one module and replacement by another, current can be delivered to the load, but no interruption will be effected if a fault takes place.

In practice, satisfactory results have been obtained where resistor 52 is a 100K-ohm resistor, capacitor 64 is a 15 microfarad capacitor, capacitor 70 is 0.25 microfarads, capacitor 84 is 100 microfarads, resistor 80 is 1K ohms, and transformer 38 is a 1:1 transformer having a 1.5 ampere secondary. The value of inductor 54 depends on the strength of magnet 56, the characteristics of reed switch 58, and the relative relationships of the elements in unit 55. Satisfactory results have been obtained, however, where permanent magnet 56 is a 32-gauss magnet, and inductor 54 is a 10K-ohm coil.

Numerous modifications may be made to the circuitry described above.

For example, the means for conducting a current between the neutral line and ground, while preferably a branch comprising a resistor and an inductor in series as shown, may consist of conventional transistor circuitry for amplification of the current change caused by the fault.

The circuitry which prevents voltage surges from causing tripping of the breaker when resetting is attempted may comprise a self-contained time-delay relay, or other well-known means for producing delayed conduction of a signal, and this delay circuitry may be used in interrupter circuits having different fault-detection means.

I claim:

1. In a single-phase, two-conductor current supply system wherein a pair of conductors are adapted to supply a current to a load, one of said conductors being at a high potential with respect to ground, and the other being at a relatively low potential with respect to ground, the combination comprising:
   signal responsive means for interrupting current in the conductor which is at a high potential with respect to ground, and
   means responsive to a predetermined change in the potential difference between the other conductor and ground, resulting from a fault between the conductor at high potential and ground, for providing a signal to effect interruption by said interrupting means when said predetermined change occurs.

2. In a single-phase, two-conductor current supply system wherein a pair of conductors are adapted to supply a current to a load, one of said conductors being at a high potential with respect to ground, and the other being at a relatively low potential with respect to ground, the combination comprising:
   signal responsive means for interrupting current in the conductor which is at a high potential with respect to ground,
   means connected between the other conductor and ground for conducting a current resulting from said relatively low potential difference, and
   means for sensing the current in said conducting means and providing a signal to effect interruption by said interrupting means when a predetermined change occurs in the current in said conducting means resulting from a fault between the conductor at high potential and ground.

3. The combination according to claim 2 in which said means for sensing the current in said conducting means comprises switching means, means for effecting opening of said switching means when said predetermined change occurs, and a relay having a winding connected to be energized through said switching means and normally closed contacts connected to conduct current to said signal-responsive means.

4. A safety device for preventing electric shock comprising:
   signal-responsive breaker means for effecting interruption of current in at least one of a group of conductors, said breaker means including manually operable resetting means allowing interruption of current in response to a signal even though said resetting means is held,
   means for sensing a ground fault in said one of said conductors and providing a signal to effect interruption, by said breaker, of current in said conductor, and
   means responsive to a closing of said breaker means for preventing said signal from being provided during a period of time immediately following said closing.

5. A safety device according to claim 4, in which said means for sensing a ground fault includes first switching means for conducting said signal to said signal responsive breaker means when a ground fault occurs, and said means responsive to a closing of said breaker means includes second switching means connected in series with said first switching means and means for preventing closing of said second switching means a period of time immediately following the closing of said breaker means.

6. A safety device according to claim 4, in which said means responsive to a closing of said breaker means comprises a delayed-action relay having contacts connected to conduct said signal to said signal responsive breaker means.

7. A safety device according to claim 4, in which said means responsive to a closing of said breaker means comprises a relay having contacts connected to conduct said signal to said signal responsive breaker means, said relay having a winding connected through a diode and resistive means to be energized when said breaker means is closed, and a capacitor connected across the winding of said relay.

8. A single-phase, two-conductor current supply system wherein a pair of conductors are adapted to supply a current to a load, one of said conductors being at a high potential with respect to ground, and the other being at a relatively low potential with respect to ground, the combination comprising:
   signal-responsive breaker means for interrupting current in the conductor which is at a high potential with respect to ground,
   an inductor connected to conduct current between the ground and the conductor which is at a low potential with respect to ground,
   a reed switch,
   a magnet arranged in proximity to said reed switch and normally biasing said reed switch into a closed condition,
   a relay connected to be operated through said reed switch and having a set of normally closed contacts which are held open when said reed switch is closed,
   means connected to said contacts for operating said signal responsive breaker means when said contacts close upon opening of said reed switch,
   said inductor being in proximity to said reed switch and arranged to overcome the bias imparted to said reed switch by said magnet when current, resulting from a ground fault, passes through said inductor.

* * * * *

UNITED STATES PATENT OFFICE
CERTIFICATE OF CORRECTION

Patent No. 3,676,738                    Dated July 11, 1972

Inventor(s)  Warren F. Scanlan

It is certified that error appears in the above-identified patent and that said Letters Patent are hereby corrected as shown below:

The name of the assignee should be changed to Hazard Sensor Inc., Rochester, New York.

In column 5, line 47, delete "difference".

Signed and sealed this 9th day of January 1973.

(SEAL)
Attest:

EDWARD M. FLETCHER, JR.                ROBERT GOTTSCHALK
Attesting Officer                      Commissioner of Patents